Figure 1:
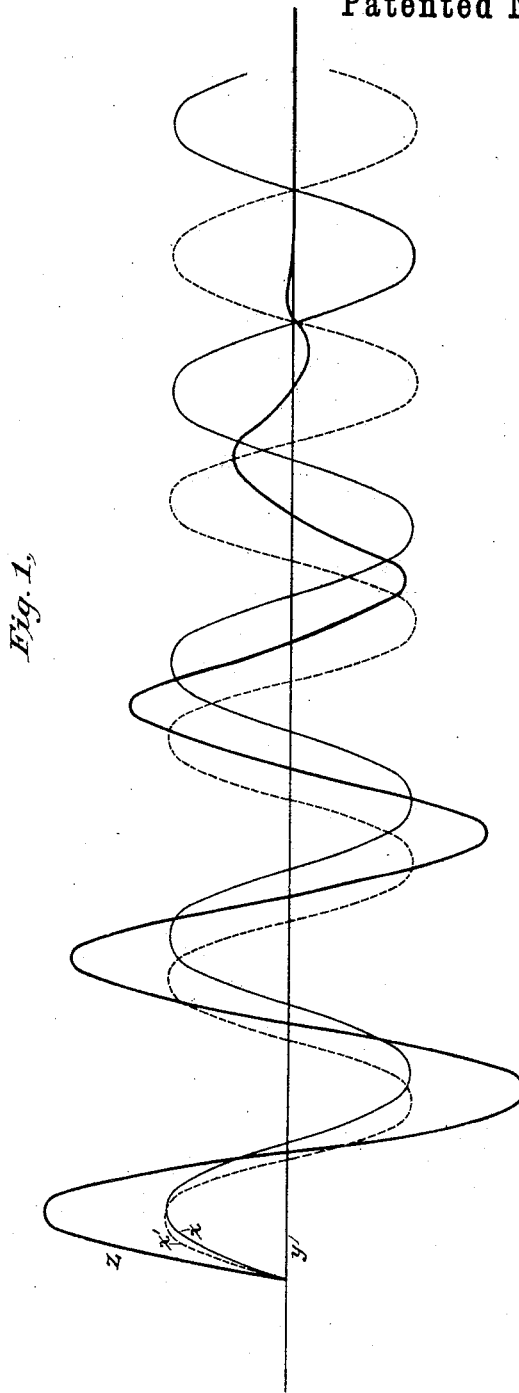

(No Model.) 2 Sheets—Sheet 1.

O. B. SHALLENBERGER.
METHOD OF AND APPARATUS FOR CONNECTING ALTERNATE CURRENT GENERATORS.

No. 372,934. Patented Nov. 8, 1887.

Witnesses
Geo. W. Breck
Carrie E. Ashley

Inventor
O. B. Shallenberger
By his Attorneys
Pope & Edgecomb (No Model.) 2 Sheets—Sheet 2.
O. B. SHALLENBERGER.
METHOD OF AND APPARATUS FOR CONNECTING ALTERNATE CURRENT GENERATORS.
No. 372,934. Patented Nov. 8, 1887.
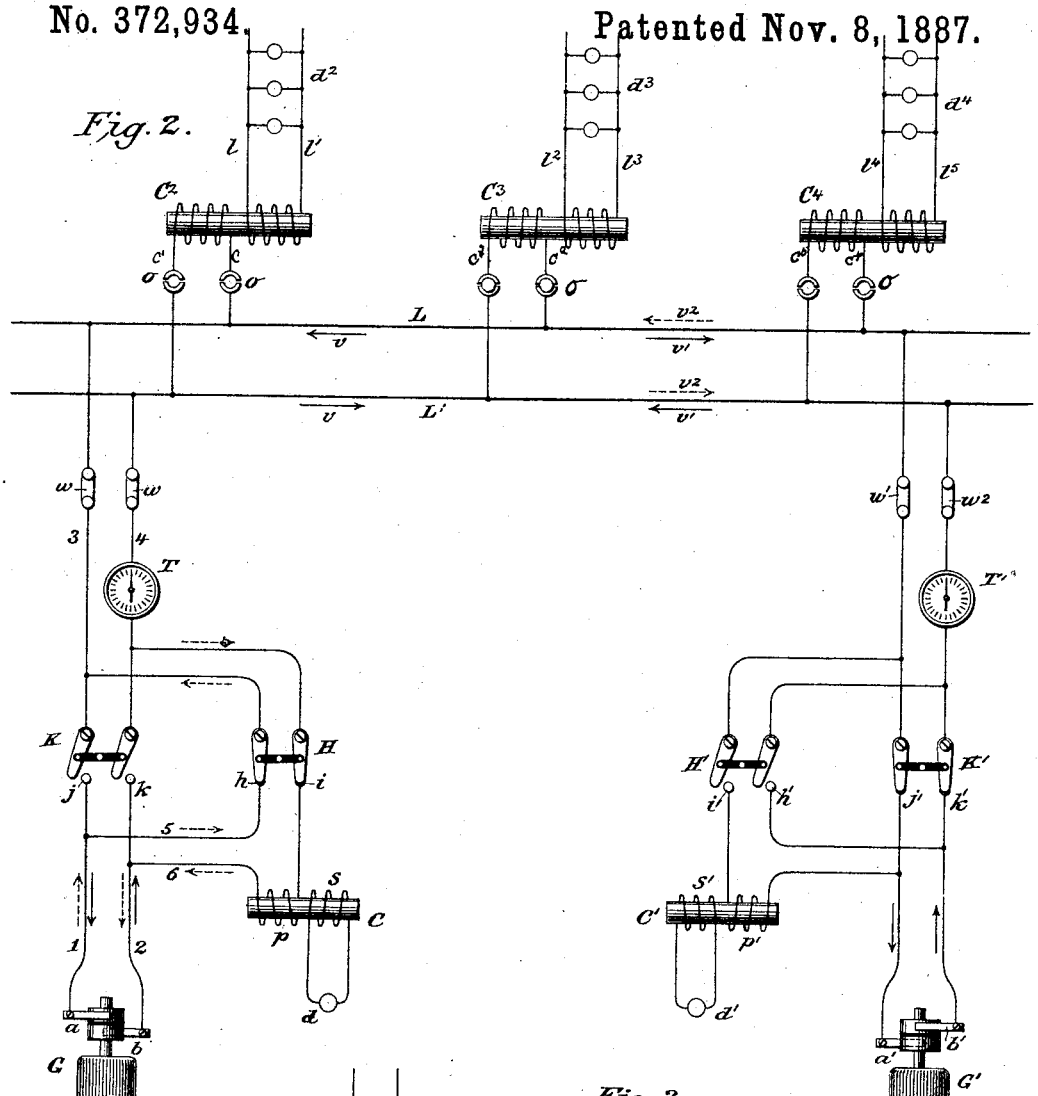
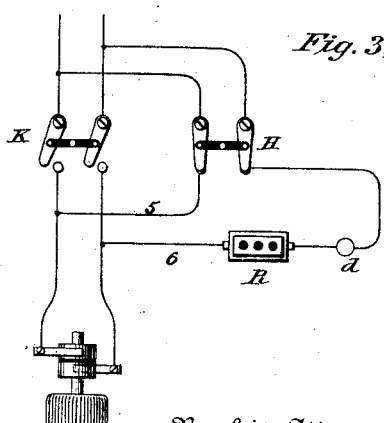
Witnesses
Geo. W. Breck
Carrie E. Ashley
Inventor
O. B. Shallenberger
By his Attorneys
Pope & Edgecomb

UNITED STATES PATENT OFFICE.

OLIVER B. SHALLENBERGER, OF ROCHESTER, ASSIGNOR TO GEORGE WESTINGHOUSE, JR., OF PITTSBURG, PENNSYLVANIA.

METHOD OF AND APPARATUS FOR CONNECTING ALTERNATE-CURRENT GENERATORS.

SPECIFICATION forming part of Letters Patent No. 372,934, dated November 8, 1887.

Application filed December 7, 1886. Serial No. 220,909. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Methods of and Apparatus for Connecting Alternate-Current Generators, of which the following is a specification.

The object of the invention is to provide means for determining the relative phases of two or more electric generators for delivering alternating currents, for the purpose of rendering it possible to bring them together in multiple-arc circuit without injury to the circuits which they are designed to supply.

In operating systems of electric distribution supplied by alternate-current generators, it is sometimes desired to couple in multiple arc more than one generator with the distributing-conductors. In practice it has been found that two generators running at approximately the same rate or delivering approximately the same number of alternating impulses per minute will, when connected in multiple-arc circuit, tend to fall into unison with each other, or to deliver currents having the same number of alternations per minute, and if a slight slippage of the belts be allowed they will continue to run in unison when once started. As it is practically impossible, however, to determine from observation of the machines themselves the exact phases of the currents, there is a probability that two machines would be out of unison and possibly in opposite phases with reference to the main line when coupled together. This would result in such a combination of the currents as to cause each machine to short-circuit through the other. In other words, the currents of the two machines would combine and flow in the same direction through the conductors connecting the two machines, and practically no current would flow upon the outside circuit. The machines might, however, ultimately come into such relations as to combine to deliver currents in the same direction to the work-circuit; but not only would there be caused irregularities in the action of the lamps or other translating devices in the exterior circuit, but a more serious difficulty would result from the combination of the two currents in the supply-circuit—namely, the burning out of the safety-catches by reason of the abnormal strength of the current. This will become more evident upon a consideration of Figure 1 in the accompanying drawings, which is a theoretical diagram illustrating the resultant current produced by the combination of the currents of two machines in varying relative phases. Fig. 2 is a diagram illustrating an organization of circuits and apparatus adapted to carry out the invention, and Fig. 3 illustrates a modification of the same.

Referring first to Fig. 2, G and G' represent two alternate-current generators, and L and L' the two main lines to which they deliver their currents. The generator G has its respective brushes, $a$ and $b$, connected by conductors 1 and 2 with two switch-points, $j$ and $k$, respectively. A switch, K, serves, when closed, to place these two points in connection through conductors 3 and 4 with the two lines L and L', respectively. From the points $j$ and $k$ conductors 5 and 6 lead to two switch-points, $h$ and $i$, respectively. A switch, H, serves, when closed, to place these two points in connection with the conductors 3 and 4, respectively, thus forming a shunt around the switch K. In one of these shunt-conductors—the conductor 6, for instance—there is included the primary coil $p$ of an electric converter, C. The secondary coil $s$ of this converter includes in its circuit a lamp or other indicating device, $d$. The generator G' is equipped in precisely the same manner, corresponding letters of reference having numeral 1 affixed indicating corresponding parts. From the lines L and L' are derived pairs of conductors $l\ l'\ l^2\ l^3\ l^4\ l^5$, &c. These are designed to supply translating devices of any desired character—as, for instance, they are here represented as being derived from the secondary coils of converters $C^2\ C^3\ C^4$, the primary coils of which are connected in multiple arc with the main lines L and L'. Translating devices $d^2\ d^3\ d^4$ are connected in the several circuits in a manner well understood. The primary coils of the converters are preferably capable of being connected with and disconnected from the main lines by means of switch-plugs $o$, or in any other convenient manner. The switch devices $o$ are inserted in the conductors $c\ c'\ c^2\ c^3\ c^4\ c^5$, connecting the respective terminals of the several primary coils of the converters $C^2\ C^3\ C^4$ with the conductors L and L', respectively. The switch devices, in connection with the converters $C^2$ and $C^3$, are represented as being open. For convenience of illustration, the lines $l^2$ and $l^3$ alone are represented as connected in circuit in the present instance. The current flowing through these conductors will, it is evident, be dependent upon the difference of potential between the two conductors L and L'. When but one generator is connected therewith, this may readily be determined, being dependent entirely upon the current from that generator; but when a second generator is connected in circuit, the currents of the two generators may combine, or they may to a greater or less extent oppose each other and produce upon the work-circuit a resultant difference of potential even lower than that from the single generator. This will be more readily understood by reference to the diagram, Fig. 1. In this figure the full line $x$ represents the current from one machine—the machine G', for instance—and the dotted line $x'$ the current from the other machine, G, with reference to a normal, $y$, which represents the neutral condition of the lines L and L' relative to any flow of current from one machine to the other. The heavy full line $z$ represents the resultant current.

Now, assuming the two machines to be connected with the lines L and L' when in opposite phases—that is to say, when the currents from the electric generator G, instead of combining with those from the generator G' to supply the intermediate branch conductors, $l^2$ and $l^3$, Fig. 2, as indicated by the arrows $v\ v$ and $v'\ v'$ in Fig. 2, are simply added to each other and flow in the same direction through the lines L and L', as indicated by the arrow $v\ v$ and the dotted arrows $v^2\ v^2$—these currents will, it is evident, flow from one machine through the short circuit formed by the other, and will thereby not only increase the current through the lines L L' beyond the normal capacity, but will at the same time withdraw the supply from the lamps or other translating devices, and also endanger the safety devices shown at $w\ w$ and $w'\ w'$. In the diagram, Fig. 1, this resultant current is illustrated by the heavy line $z$. Assuming that the phases of the currents $x'$ and $x$ are at a given moment different and that the phases of the current $x'$ gain in frequency upon those of the current $x$, then the resultant current will gradually approach more nearly to the normal $y$, and at the moment the two generators are in unison—that is to say, delivering like currents to the outside or work circuit—the line $z$ will coincide with the normal $y$. If the two generators were coupled at this moment, no change or fluctuation in the lights or translating devices in the working-circuit would be observed, and no current from the one generator would flow through the other, since the line $y$ represents the absence of any current through the circuit L L' and the generators.

It now remains to describe the method of employing the apparatus for determining the relative phases of the two machines. Assuming the switch K' to be closed and the switch K open, then, if the switch H be also closed, a current from the generator G will traverse the coil $p$ of the converter C and cause the indicating device $d$ to be operated. If this be an incandescent lamp, it will burn with a certain brilliancy. This brilliancy will depend, however, upon the combined action of the two generators, for if the currents in the generator G' be such as to coincide in the lines L and L' with those from the generator G, then the lamp will be operated by the current due to the added electromotive forces of the two generators, and it will burn at its highest degree of brilliancy. When, however, the generators are in unison and delivering currents of like direction to the outside circuit, the lamp will be fed by the current due to the difference of the electromotive forces of the two generators, and will be at its lowest efficiency. If the two machines are adjusted to give the same electromotive force, then no current will flow and the lamp will not light up.

For the purpose of determining the work being done by the respective generators two ammeters, T and T', may be included in circuit with the respective generators. The lamp $d$ will thus indicate the proper period for closing the switch K and connecting the generator G in full circuit with the conductor L L', it being understood that the coil $p$ has only enough inductive resistance to permit the flow of a sufficient current to operate the device $d$ in the required manner. By watching the rise and fall of the visual indicator $d$ for a few moments the attendant may readily determine the rate at which the phases change and the proper moment for closing the switch, and when once thus brought into proper relations the two machines will continue to operate in unison, owing to the dynamic effects which each machine exerts upon the other. The switch H may then be opened or not, as found desirable. Were the generator G first in circuit the generator G' would then be connected in circuit at the proper moment by means of the indicator $d'$ and switch K'.

It will be understood that other arrangements of indicators may be used. For instance, the indicator $d$ may be placed, as shown in Fig. 3, in the circuit of the conductor 6, a resistance, R, being employed for determining the current which shall flow through that conductor.

Other methods of indicating the resultant current may of course be employed, and I do not wish to be understood as confining myself to any specific method or arrangement of apparatus for this purpose.

I claim as my invention—

1. The hereinbefore-described method of bringing an alternate-current electric generator into multiple arc with another similar generator when both are in action, which consists in first connecting it through a circuit of high resistance, indicating the current traversing this circuit, and thereby noting the relative phases of the two generators, and at a moment when the phases are in unison connecting the generator independently of the resistance.

2. The hereinbefore-described method of connecting alternate-current electric generators with a work-circuit when in action, which consists in first connecting them with each other through a resistance-circuit, indicating the resultant current traversing the circuit, and at the moment of minimum current through said resistance-circuit shunting or cutting out the resistance.

3. The combination, with an alternate-current electric generator and a circuit supplied therefrom, of a second alternate-current generator, a resistance-circuit through which the second generator may be connected in multiple arc with said circuit, an indicating device operated by the currents traversing the resistance-circuit, and means for cutting out the resistance and indicating device.

4. The combination of one or more alternate-current electric generators, a circuit for the same, translating devices fed from said circuit, a second generator, a circuit through which said generators may be connected in multiple arc with the translating devices, an indicator in said circuit operated by the resultant current from all the machines, and means for connecting the second generator independently of the indicating device.

5. The combination of an alternate-current electric generator, a supply-circuit fed therefrom, a second alternate-current generator, means for connecting the same with said circuit in multiple arc with the first, an electric converter, means for connecting the primary coil of the converter in the circuit of the second generator, and an indicating device included in the circuit of the secondary coil of the converter.

6. The combination, substantially as described, of an alternate current electric generator, a supply-circuit, a second generator, connections whereby the generators may be connected with the circuit either independently or in multiple arc with each other, an indicating device for each generator, and means for causing at will the current from either generator or the resultant current from both generators to operate the corresponding indicating device.

In testimony whereof I have hereunto subscribed my name this 29th day of October, A. D. 1886.

OLIVER B. SHALLENBERGER.

Witnesses:
LEWIS B. STILLWELL,
CHARLES A. TERRY.